US009735572B2

(12) United States Patent
Weber et al.

(10) Patent No.: US 9,735,572 B2
(45) Date of Patent: Aug. 15, 2017

(54) LOW-VOLTAGE DC POWER SUPPLY FOR ELECTRONIC COMMUNICATION DEVICES

(71) Applicant: NEXANS, Paris (FR)

(72) Inventors: Herve Weber, Charleville-Mezieres (FR); Borja Thomas, Paris (FR); Eduard De Ridder, Herdersem-Aalst (BE)

(73) Assignee: Nexans, Paris (FR)

( * ) Notice: Subject to any disclaimer, the term of this patent is extended or adjusted under 35 U.S.C. 154(b) by 584 days.

(21) Appl. No.: 14/350,627

(22) PCT Filed: Sep. 18, 2012

(86) PCT No.: PCT/FR2012/052085
§ 371 (c)(1),
(2) Date: Apr. 9, 2014

(87) PCT Pub. No.: WO2013/057399
PCT Pub. Date: Apr. 25, 2013

(65) Prior Publication Data
US 2014/0300190 A1  Oct. 9, 2014

(30) Foreign Application Priority Data

Oct. 19, 2011  (FR) ..................................... 11 59458

(51) Int. Cl.
*H02J 1/00* (2006.01)
*H02J 11/00* (2006.01)
(Continued)

(52) U.S. Cl.
CPC ................. *H02J 1/00* (2013.01); *H02J 11/00* (2013.01); *H04B 3/548* (2013.01); *H02M 5/08* (2013.01);
(Continued)

(58) Field of Classification Search
CPC ........................................................ H02J 1/00
(Continued)

(56) References Cited

U.S. PATENT DOCUMENTS

| 2,313,950 A | 3/1943 | Langguth et al. |
| 2003/0043027 A1* | 3/2003 | Carson ..................... H04B 3/54 375/259 |
| 2011/0140911 A1 | 6/2011 | Pant et al. |

FOREIGN PATENT DOCUMENTS

| FR | 1092040 | 4/1955 |
| JP | 2006319449 | 11/2006 |

OTHER PUBLICATIONS

Search Report dated 2013.

* cited by examiner

*Primary Examiner* — Joseph Chang
(74) *Attorney, Agent, or Firm* — Sofer & Haroun, LLP

(57) ABSTRACT

The present invention relates to a system (100) for supplying low-voltage DC power to at least one electronic communication device (3;6) in a power line carrier communication system furthermore including a power line carrier coupler comprising a coupling capacitor (10) electrically linked to a medium-voltage line (8) of a power distribution network. According to the invention, the system (100) comprises means (15) for generating a first low DC voltage value based on a current-to-voltage conversion of the leakage current related to said coupling capacitor (10), said first low DC voltage value being able to act as power supply to at least one active electronic component (13) of said at least one electronic communication device (3;6).

11 Claims, 4 Drawing Sheets

(51) Int. Cl.
*H04B 3/54* (2006.01)
*H02M 5/08* (2006.01)
(52) U.S. Cl.
CPC ............... *H04B 2203/547* (2013.01); *H04B 2203/5483* (2013.01); *Y10T 307/406* (2015.04)
(58) Field of Classification Search
USPC .......................................................... 307/31
See application file for complete search history.

Low voltage (< 400 volts) Medium voltage (> 1 Kvolts)

LOW-VOLTAGE DC POWER SUPPLY FOR ELECTRONIC COMMUNICATION DEVICES

RELATED APPLICATIONS

This application is a National Phase Application of PCT/FR2012/052085, filed on Sep. 18, 2012, which in turn claims the benefit of priority from French Patent Application No. 11 59458 filed on Oct. 19, 2011, the entirety of which are incorporated herein by reference.

BACKGROUND

Field of the Invention

The present invention relates in a general manner to low-voltage DC power supply for electronic communication devices able to be used in a medium-voltage part of a power line carrier communication system.

Description of Related Art

A non-limiting field of application of the invention relates to remote reading systems for energy meters, particularly electricity meters. Certain electricity providers, such as the French company ERDF, are today in the process of deploying systems using the power lines of the power distribution network to allow communication, preferably two-way, of data between the electricity meters installed in the homes of users and hubs in charge of collecting the data from a set of meters. FIG. 1 schematically shows the configuration of such a system, indicating in the upper part of the figure the communication layer of the system facing the physical layer of an energy distribution network: an electricity meter 1 situated in the home 2 of a user exchanges data with a hub 3 using the low-voltage (typically between 220 and 400 volts) power lines 4 of the power distribution network. This so-called PLC (Power Line Carrier) technology consists in overlaying on the low-frequency electrical signal of the power distribution network (typically 50 Hz in France, or 60 Hz in the United States) a low-energy signal at a higher frequency, typically in the frequency band called CENELEC A (from 10 KHz to 95 KHz). When the hub 3 receives the data from various meters 1, it decodes them using a suitable PLC modem, and processes them with a view to retransmitting them to a central server 5 of the energy distributor by any appropriate WAN wide area communications network 5a.

Apart from the hub, additional appliances can be added at the level of the medium-voltage part of the power distribution network. In particular, as the PLC signal weakens with distance, it may be necessary to regenerate it when the hub is too remote. To do this, as shown in FIG. 2, it may be necessary to add one or even several repeaters 6 to regenerate the PLC signal as many times as necessary all the way to the hub 3.

Whatever the appliance under consideration (hub 3, repeater 6 or any other electronic appliance able to inject and/or read the PLC signal), said appliance must be able to interface with the medium-voltage power line 8 by means of a coupling device. Today, this is achieved using a power line carrier coupler 9 electrically linked to the medium-voltage line 8 of the power distribution network. This coupler 9 must allow the passage of the PLC signal while rejecting the frequency of the electrical network, and must protect the appliance from the voltage of the electrical network and the transient voltages that could result from switching operations. FIG. 3 schematically illustrates a possible known embodiment for the coupler 9, in association with a hub 3.

The coupler 9 essentially includes a coupling capacitor 10 and an isolation transformer 11 arranged in such a way that:
  the coupling capacitor 10 is electrically linked on the one hand to the medium-voltage line 8 and, on the other hand, in series with the isolation transformer 11;
  the secondary of the isolation transformer 11 is connected to the hub 3.

A compensating module 10' is interposed in series between the coupling capacitor 10 and the primary of the isolation transformer 11 to allow the filtering to be adapted, and in particular to obtain a low attenuation in the bandwidth of the PLC signal.

All the aforementioned electronic appliances include active components (microprocessors, amplifiers etc.) that must be powered by one or more DC voltage values, typically in the order of 3.3 volts or of 12 volts. Today, the hub 3 is generally situated at the level of a Medium-Voltage/Low-Voltage power transforming substation 7 of the power distribution network, which makes it possible to derive the voltage needed for the power supply from the low-voltage lines of the electrical network.

It is not, on the other hand, possible to envision placing the hub at another location, typically further upstream in the medium-voltage part of the network, unless a solution is found for supplying power to the active components. The repeaters themselves are placed on the medium-voltage part of the power distribution network, at locations where the low-voltage network is generally not present.

OBJECTS AND SUMMARY

The present invention has the aim of proposing a simple, cheap and compact solution to the problem of the supply of low-voltage DC power to electronic communication devices able to be coupled to a medium-voltage line of the power distribution network.

To do this, the subject of the invention is a method for supplying low-voltage DC power to at least one electronic communication device in a power line carrier communication system furthermore including a power line carrier coupler for coupling to a medium-voltage line of a power distribution network, characterized in that, the power line carrier coupler comprising a coupling capacitor electrically linked to said medium-voltage line, the method comprises a step of generating a first low DC voltage value based on a current-to-voltage conversion of the leakage current related to said coupling capacitor, said first low DC voltage value being able to act as power supply to at least one active electronic component of said at least one electronic communication device.

Another subject of the present invention is a system for supplying low-voltage DC power to at least one electronic communication device in a power line carrier communication system furthermore including a power line carrier coupler for coupling to a medium-voltage line of a power distribution network, characterized in that said power line carrier coupler comprises an electrically linked coupling capacitor, and in that the system comprises means for generating a first low DC voltage value based on a current-to-voltage conversion of the leakage current related to said coupling capacitor, said first low DC voltage value being able to act as power supply to at least one active electronic component of said at least one electronic communication device.

According to other possible particularities of the system:
  the generating means can include at least one conversion unit comprising a capacitor linked in series with the coupling capacitor and a transforming means receiving as input the voltage across she terminals of said capacitor and delivering said first low DC voltage value;

the generating means advantageously include an integer number n greater than 1 of conversion units interlinked so that the capacitors of each conversion unit are linked in series with the coupling capacitor, each of said units delivering an nth of said first low DC voltage value;

the system can furthermore include a means for lowering DC voltage receiving as input said first low DC voltage value and delivering a second low DC voltage value smaller than the first DC voltage value. This means for lowering DC voltage can be incorporated into said generating means;

the power line carrier coupler and the generating means, or even the electronic communication device, can be advantageously incorporated into one and the same appliance;

the appliance is then able to be installed on a medium-voltage electricity pole of the power distribution network;

the electronic communication device can be a hub, a repeater, or a PLC/radiofrequency gateway of a system for remotely reading electricity meters or for monitoring the power distribution network.

BRIEF DESCRIPTION OF THE DRAWINGS

The invention in its various aspects will be better understood upon reading the following non-limiting description of a system capable of remotely reading electricity meters made with reference to the appended figures, in which.

DETAILED DESCRIPTION

The present invention starts from the observation that the power line carrier coupler that is used to make the coupling between the medium-voltage line of the power distribution network and any electronic communication device such as a hub, a repeater, or any other, has a leakage current. This leakage current is very small, in the order of a few milliamperes for a coupling capacitor of 1.5 nanofarads, and is generally considered as an unwanted current.

The present invention consists in using this leakage current to generate the DC voltage values needed to supply power to the active components of the electronic communication devices coupled to the medium voltage line across this coupling capacitor.

Thus, the method according to the invention comprises a step of generating a first low DC voltage value based on a current-to-voltage conversion of the leakage current related to the coupling capacitor, said first low DC voltage value being able to act as power supply to at least one active electronic component of at least one electronic communication device coupled to the medium-voltage line of the energy distribution network.

Figure 4:
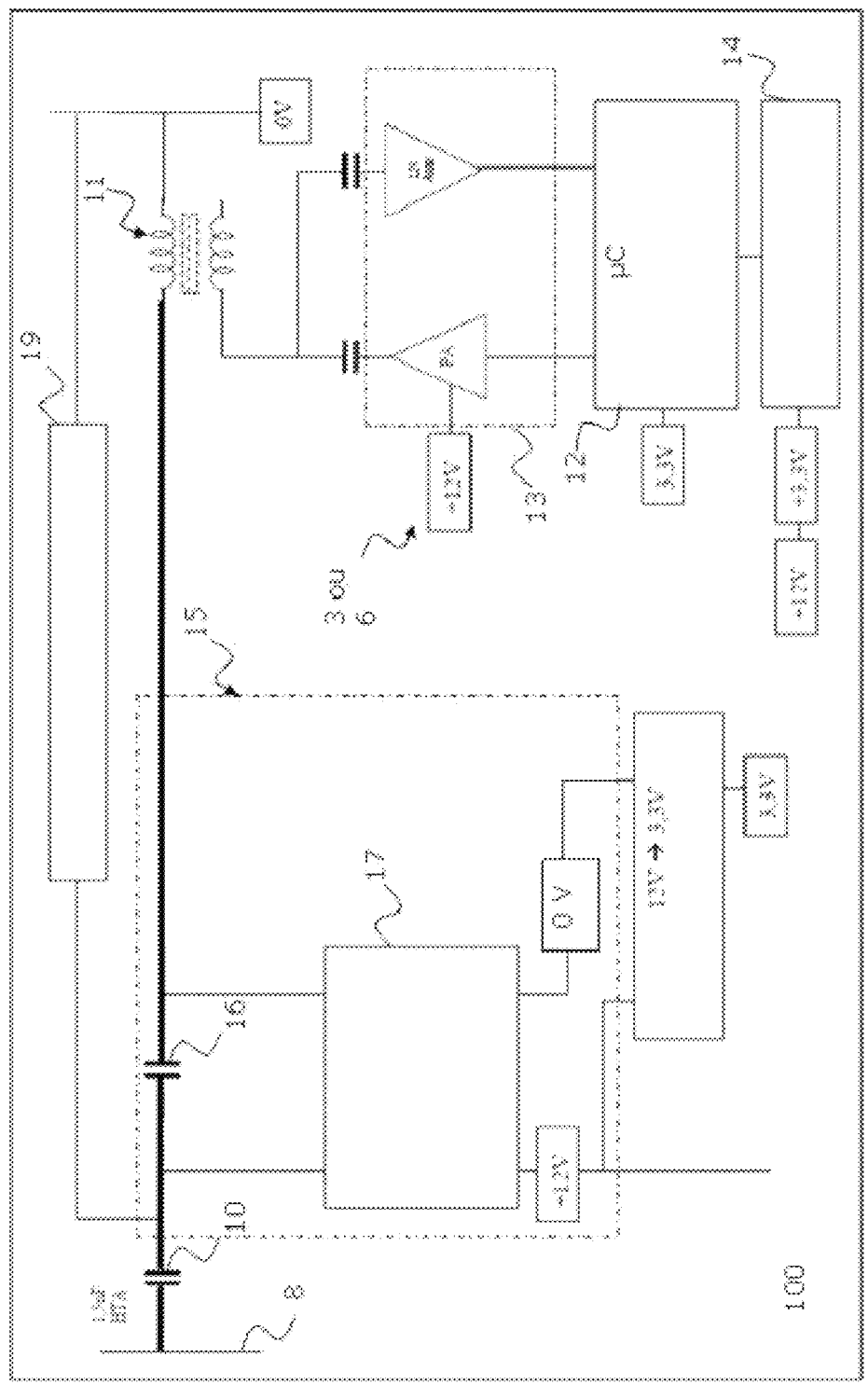
FIG. 4 schematically shows a power supply system according to a first possible embodiment in accordance with the present invention.

FIG. 4 schematically illustrates a power supply system 100 implementing the method according to a first possible embodiment of the invention. This figure shows the elements already described previously such as the coupling capacitor 10 and the isolation transformer 11 constituting a power line carrier coupler allowing an electronic communication device such as a hub 3 or a repeater 6 to read and/or inject a PLC signal over a medium-voltage power line 8 of the power distribution network. As shown on the right of the figure, the electronic device 3 or 6 includes various active components, typically a microcontroller 12, an analog circuit 13 acting as interface between the microcontroller 12 and the isolation transformer 11 and comprising power amplifiers, and possibly other components such as a radiofrequency communication module or a fiber optics communication module. All these active components need to be powered by a low-voltage DC voltage. In the non-limiting example shown, the microcontroller 12 requires a power supply of 3.3 volts, whereas the power amplifiers of the analog circuit 13 require a 12 volt power supply. Furthermore, some active components of the module 14 can require a power supply of 3.3 volts, others a power supply of 12 volts.

In accordance with the invention, the system 100 comprises means 15 for generating a first low DC voltage value, in this case 12 volts, from a current-to-voltage conversion of the leakage current related to said coupling capacitor 10, said first low DC voltage value being able to act as power supply to at least one active electronic component of the electronic communication device, in particular in this case to the power amplifiers of the analog circuit 13 and to certain components of the radiofrequency or fiber optics communication module 14. The generating means 15 in this case include a conversion unit comprising a capacitor 16 linked in series with the coupling capacitor 10, between the coupling capacitor and the primary of the isolation transformer 11, and a transforming means 17 receiving as input the voltage across the terminals of said capacitor 16 and delivering the first low DC voltage value. The transformation means overall produces a rise in the voltage across the terminals of the capacitor 16 to obtain the first DC voltage value.

In the example shown, the system 100 furthermore includes a means 18 for lowering DC voltage receiving as input said first low DC voltage value and delivering a second low DC voltage value below the first low DC voltage value, in this case 3.3 volts. The means 18 for lowering DC voltage can be incorporated or not incorporated into the generating means 15. Means 19 for protecting against power surges are advantageously provided between the coupling capacitor and the ground.

The values of the coupling capacitor 10 and of the additional capacitor 16 must be chosen to allow coupling while also optimizing size. A high coupling capacitance allows better coupling, but to the detriment of the size. With components in existence today, trials by the Applicant have shown that the total value of the series connection of the capacitors must not exceed 1.5 nanofarads to guarantee the best compromise between good coupling and reduced size. In the example in FIG. 4, it is possible to choose a capacitor 16 having a value of 10 nanofarads, so that the equivalent capacitance resulting from the series connection of the coupling capacitor 10 and the capacitor 16 is equal to 1.30 nanofarads.

Especial care must be taken in producing the generating means to ensure that they do not disturb the primary role of the power line carrier coupler. A first measure is to prevent the generating means 15 from generating noise on the communication signal. To do this, an EMI filter (not shown) is advantageously provided against the electromagnetic interference at the input of the transforming means 17.

Furthermore, the passive components (resistors, inductors and capacitors) of the compensating module 10' need to be suited to take account of the presence of the generating means 15 and to guarantee low attenuation in the bandwidth of the PLC signal.

Figure 5:
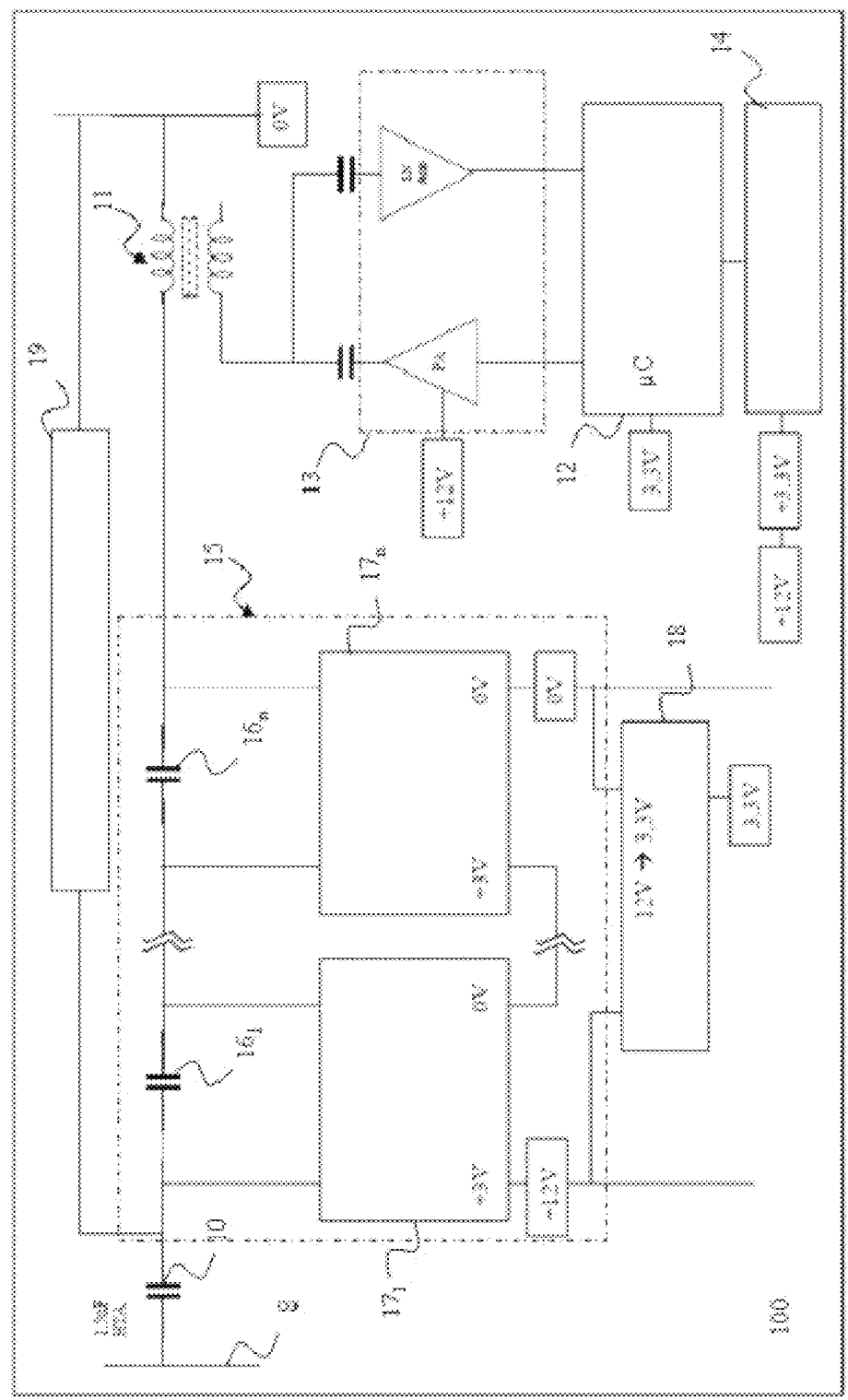
FIG. 5 schematically shows a power supply system according to a second possible embodiment in accordance with the present invention.

FIG. 5 illustrates a second possible embodiment of the power supply system 100. In this case, the generating means include an integer number n greater than 1 of conversion units interlinked so that the capacitors $16_1$ to $16_n$ of each conversion unit are linked in series with the coupling capacitor 8, each of said units delivering, at the output of its corresponding transforming means $17_1 \ldots 17_n$, an nth of said first low DC voltage value. Thus, in the case where a voltage of 12 volts is desired, it is possible to cascade four conversion units each delivering 3 volts. The outputs of the conversion units being themselves linked in series, the 12 volts voltage will be obtained in this case between the 3 volts output of the first conversion unit $16_1$ and the 0 volt output of the fourth conversion unit. Each conversion unit furthermore comprises an EMI filter (not shown) for preference. The choice of the number of conversion units is the result of a compromise between the number of components and the admissible tensile stress on the components. The table hereinafter shows a comparison of the results obtained for a number of conversion units varying from 1 to 4:

| Number of units | Input power per unit (W) | Input voltage of a unit (V) | Output power per unit (W) | Output voltage of a unit | Capacitance of each unit (nF) |
|---|---|---|---|---|---|
| 1 | 7.10 | 1420 | 5.0 | 12 | 5 |
| 2 | 3.55 | 710 | 2.5 | 6 | 10 |
| 3 | 2.37 | 473 | 1.7 | 4 | 15 |
| 4 | 1.78 | 355 | 1.3 | 3 | 20 |

Owing to the invention, a current until now considered as unwanted is re-used to generate the low DC voltage values necessary to supply power to the active components of any communication device coupled to the medium-voltage line by the PLC capacitive coupler. The installations of the devices are therefore no longer limited only to the locations where a low-voltage/medium-voltage transformer is present, and can be extended to the whole medium-voltage network.

Figure 1:
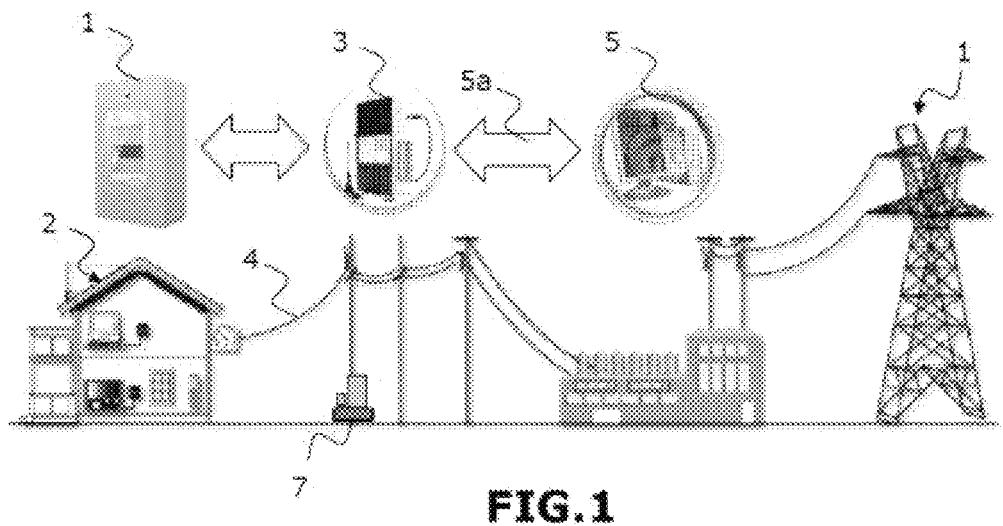
FIG. 1 already described schematically illustrates the architecture of a system for remotely reading electricity meters using the electrical energy distribution network.
Figure 2:
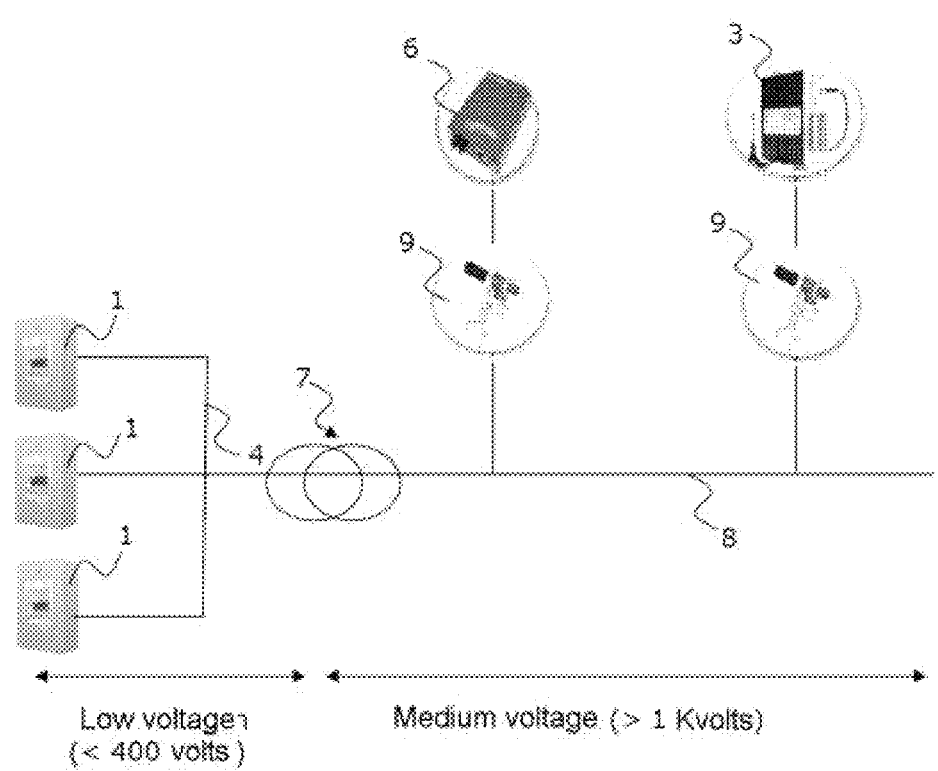
FIG. 2 already described schematically illustrates a known implementation of the system in FIG. 1.
Figure 3:
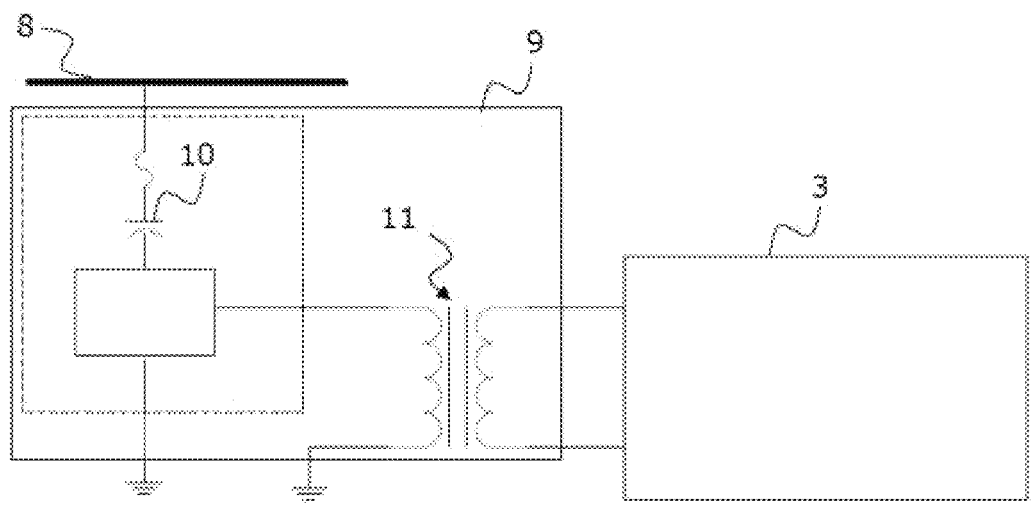
FIG. 3 already described shows a known power line carrier coupler able to couple an electronic device to a medium-voltage line of the distribution network.
Figure 6:
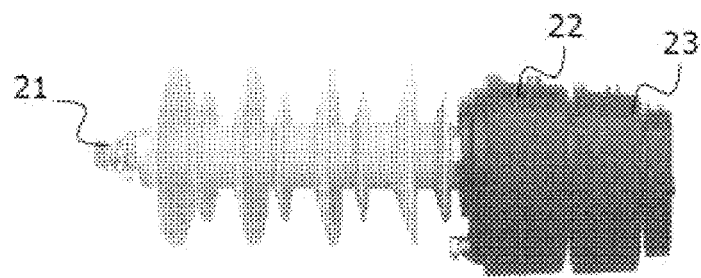
FIG. 6 illustrates an appliance according to the invention incorporating the coupler and the repeater or the hub.
Figure 6:

Furthermore, given the fairly small sizes, it is possible to envision incorporating into one and the same appliance the power line carrier coupler 9, the generating means 15, or even the electronic communication device. FIG. 6 shows such an appliance 20 comprising an end 21 for the connection of a cable (not shown) to a medium-voltage line of the distribution network, a first module 22 including the power line carrier capacitive coupler and the means for generating a low-voltage power supply, and a second module 23 corresponding to the electronic communication device, in this case a repeater. The appliance 20 thus constitutes a self-powered repeater, which can be installed at the level of any medium-voltage electric pole of the distribution network.

The invention has been described essentially in its application to a system for remotely reading electricity meters, but can of course be applied for other purposes, for example in a system for monitoring the power distribution network comprising sensors and appliances transmitting the data sensed by power line carrier.

The invention claimed is:

1. Method for supplying low-voltage DC power to at least one electronic communication device in a power line carrier communication system furthermore including a power line carrier coupler for coupling to a medium-voltage line of a power distribution network, wherein said power line carrier coupler has a coupling capacitor electrically linked to the medium-voltage line, said method comprising the steps of:
   generating a first low DC voltage value based on a current-to-voltage conversion of the leakage current related to said coupling capacitor, said first low DC voltage value being able to act as power supply to at least one active electronic component of said at least one electronic communication device.

2. Method according to claim 1, wherein said method furthermore includes a step of transforming said first low DC voltage value into a second low DC voltage value below the first low DC voltage value, said second low DC voltage value being able to act as power supply to the at least one other active electronic component of said at least one electronic communication device.

3. System for supplying low-voltage DC power to at least one electronic communication device in a power line carrier communication system furthermore including a power line carrier coupler for coupling to a medium-voltage line of a power distribution network, where said power line carrier coupler has a coupling capacitor electrically linked to said medium-voltage line, said system comprising:
   means for generating a first low DC voltage value based on a current-to-voltage conversion of the leakage current related to said coupling capacitor, said first low DC voltage value being able to act as power supply to at least one active electronic component of said at least one electronic communication device.

4. System according to claim 3, wherein the generating means include at least one conversion unit comprising a capacitor linked in series with the coupling capacitor and a transforming means receiving as input the voltage across the terminals of said capacitor and delivering said first low DC voltage value.

5. System according to claim 4, wherein the generating means include an integer number n greater than 1 of conversion units interlinked so that the capacitors of each conversion unit are linked in series with the coupling capacitor, each of said units delivering an nth of said first low DC voltage value.

6. System according to claim 4, wherein said system furthermore includes a means for lowering DC voltage receiving as input said first low DC voltage value and delivering a second low DC voltage value smaller than the first DC voltage value.

7. System according to claim 6, wherein said means for lowering DC voltage is incorporated into said generating means.

8. System according to claim 3, wherein the power line carrier coupler and the generating means are incorporated into one and the same appliance.

9. System according to claim 3, wherein the power line carrier coupler, the generating means and said electronic communication device are incorporated into one and the same appliance.

10. System according to claim 8, wherein said appliance is then able to be installed on a medium-voltage electricity pole of the power distribution network.

11. System according to claim 3, wherein said at least one electronic communication device is a hub, a repeater or a PLC/radiofrequency gateway of a system for remotely reading electricity meters or for monitoring the power distribution network.

\* \* \* \* \*